US007313256B2

(12) United States Patent
Lo

(10) Patent No.: US 7,313,256 B2
(45) Date of Patent: Dec. 25, 2007

(54) PROGRESSIVE FINGERPRINT MATCHING SYSTEM AND METHOD

(75) Inventor: Peter Zhen-Ping Lo, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 746 days.

(21) Appl. No.: 10/674,665

(22) Filed: Sep. 29, 2003

(65) Prior Publication Data

US 2004/0062426 A1    Apr. 1, 2004

Related U.S. Application Data

(60) Provisional application No. 60/415,065, filed on Sep. 30, 2002.

(51) Int. Cl.
*G06K 9/00* (2006.01)
(52) U.S. Cl. ............ 382/124; 382/125; 340/5.53; 340/5.83
(58) Field of Classification Search ............ 382/116, 382/124–127; 340/5.53, 5.83; 356/71
See application file for complete search history.

(56) References Cited

U.S. PATENT DOCUMENTS 5,960,101 A * 9/1999 Lo et al. ............ 382/125

6,941,003 B2 * 9/2005 Ziesig ............ 382/124
2003/0031348 A1 * 2/2003 Kuepper et al. ............ 382/116

OTHER PUBLICATIONS

Prabhakar et al., Decision-Level Fusion in Fingerprint Verification, 2001, Springer-Verlag Berlin Heidelberg, pp. 88-98.*

* cited by examiner

*Primary Examiner*—Bhavesh M Mehta
*Assistant Examiner*—John B Strege
(74) *Attorney, Agent, or Firm*—Valerie M. Davis

(57) ABSTRACT

An automated digital processing system and method for characterizing the probability of a finger print match for at least one finger including a means for providing at least a plurality of match scores for at least one finger; a means for providing a finger index; a means for providing a number of fingers used in the search; a means for providing a number of times a finger index appears in a subset of probable matches; and a means for providing a number of records in the database. At least two record identification metrics are calculated and a means for calculating a match credibility metric of the calculated record identification metrics is provided based on a function of at least one of: the number of fingers used in the search, the first record identification metric, and the second record identification metric. A means for providing a user with at least one of the record identification metrics is further provided.

14 Claims, 3 Drawing Sheets

PROGRESSIVE FINGERPRINT MATCHING SYSTEM AND METHOD

REFERENCE TO PRIOR APPLICATIONS

This application claims the benefit of U.S. Provisional Application Ser. No. 60/415,065, filed on Sep. 30, 2002, assigned to the same assignee.

FIELD OF INVENTION

This invention relates generally to pattern identification matching systems, and more particularly to a system and method of matching patterns of prints, including fingerprints, palm prints, etc.

BACKGROUND

"Ten prints" is a generic term used in the art to mean a set of fingerprints which may be taken either directly from a person's fingers or palms, or may be scanned from a print card. Prints taken directly are obtained by placing the fingers (and/or palms) on a scanner or by inking the fingers, etc. onto a paper card. Each print contains minutia features which have respective X-Y coordinate positions and angles of orientation as conventionally known in the art.

For many civil and criminal applications, such as identification verification, immigration control, etc., it is necessary to match the ten prints obtained from a person to ten print records stored in a database. In conventional automatic fingerprint identification systems (AFIS), the fingerprint features are captured from a person's ten prints to form what is termed a "search record". In a similar manner, the fingerprint features extracted from ten print cards of known identities have been stored in a database as "file records." To determine a match, a search record and the file records are compared in a fingerprint matcher microprocessor and matcher scores are determined as a measurement of how similar the compared minutiae are.

In the prior art, a minutiae matched score is determined for each of the ten fingers (or palm print) relating to the number of individual minutiae of that finger of the search record that compares to the minutiae of the same finger that is in the file record. The higher the score, the more similar the search and file prints are determined to be. The scores are then added for the compared fingers (that may be less than 10) of the search to the file records, and then dividing the score totals by the number of fingers compared, to thus obtain an average matched score. A sorted list may be compiled from candidate file records, and a subset of candidates are selected based on an average score threshold. This subset is then sent to an examiner for review to determine the correctness of the matched prints. Since each potential matched record must be visually verified, the selection of an accurate candidate list is quite important in the process. The amount of time and energy to review a large list of candidate records is a drain on resources that are becoming more stretched as the demand for fast and accurate identification services are required. If the list is too small, the mated candidate may not be in the list since the method of averaging matched scores does not take into account even if a pair of fingerprints is matched. Even if two of the compared finger pairs exhibit high match scores, lower match scores for the rest of the fingers may override the observed results. Thus lower match scores that may result because of operator differences in pressure or technique in obtaining the prints, smudging of the prints or background noise may cancel out the higher match scores for some of the fingers of the sets that are legitimate and valuable in determining the identification of an individual. Solutions to these problems, to date, have included increasing the number of manual examiners required to provide the identification results in a timely fashion or to forego accuracy in lieu of speed.

Thus, an enhanced system and method of identification using, for example, a ten print to ten print search that provides reliable decision logic and accuracy in the initial computer search of prints remains a goal in this area. It would be desirable to have an adaptive multi-level matching and decision logic system and a method that provides decision for the individual pairs of matched prints and records, that better utilizes the resulting scores in a progressive rather than an averaged score to more accurately obtain the desired identification and fast response time.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Figure 1:
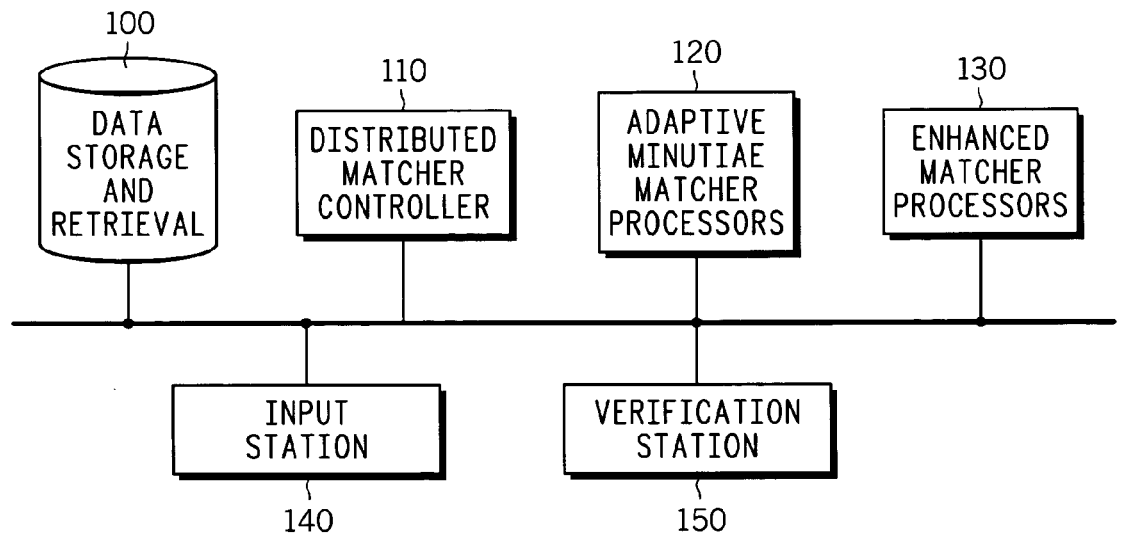
FIG. 1 is a schematic drawing of a hardware system including the fingerprint matching system in accordance with the present invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

It will be appreciated that for simplicity and clarity of illustration, elements shown in the figures have not necessarily been drawn to scale. For example, the dimensions of some of the elements are exaggerated relative to each other.

Further, where considered appropriate, reference numerals have been repeated among the figures to indicate corresponding elements.

FIG. 1 illustrates a fingerprint matching processing system 10 that may be used to incorporate the inventive system and is described in more detail in U.S. Pat. No. 5,960,101. The system 10 includes a data storage and retrieval system 100 that stores and retrieves minutiae and images of prints, including fingerprints and palm prints. In one embodiment, the prints are scanned using a commercially available scanner and subsequently processing the images before storing in the system 100.

The system 10 also includes a distributed matcher controller 110 and an adaptive minutiae matching processor 120 which perform an initial match of a first print set to a second print set. The inventive system is loaded into the processor 120 in one embodiment. A flow diagram of an embodiment of the inventive system is illustrated in detail in FIG. 3.

The records may be processed from unsolved latent prints, ten print fingerprints or palm prints, etc. An unsolved latent print is typically defined as a finger or palm print lifted from a crime scene or unknown source whose owner is unknown. A ten print fingerprint generally corresponds to the prints of ten fingers taken from a person by either the rolled or flat method of capturing the prints in a media; however, in some cases, a ten print file may contain fewer than 10 fingerprints. Typically, the ten print fingerprints are processed to form a search record which is matched against pre-processed file records from known identities. It is understood that ten prints may include toe or palm prints as well.

The minutiae matching system 10 also includes an enhanced matcher processor 130 which may be based on any one of a number of available computer systems, such as a personal computer or Unix computer system manufactured by Hewlett Packard Compaq Corporation.

The minutiae matching system 10 may optionally include a number of workstations, such as an input station 140 and a verification station 150. The above systems are well known in the art and currently available from Printrak International, a Motorola company having a location in Anaheim, Calif.

Figure 2:
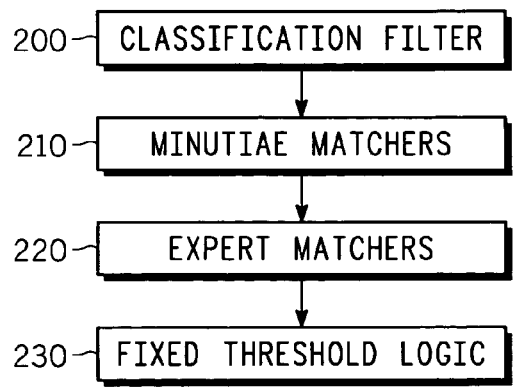
FIG. 2 is a flow diagram illustrating a matched fingerprint system of the prior art.

FIG. 2 illustrates a flow diagram of a conventional down-selection method of matching prints. In this method, identified finger or palm prints (or both) are captured. The prints may be scanned live (i.e., directly from a person's fingers or palm placed on a scanner) or may be scanned from a print card. Each print contains higher-order features (i.e., loops, whorls, arches, ridge flow, core and delta, and the like) as well as minutiae which have respective X-Y coordinate positions and angles of orientation as known in the art. A plurality of such records may be processed in the algorithm depicted in FIG. 2 in order to reduce the number of candidate matches for visual verification. At step 200, the number of records provided for subsequent matching may be reduced based on higher-order features. One example of this process is the use of the classification filter. At step 210, the number of records provided for further enhanced matching may be further reduced based on minutiae features (e.g., X-Y coordinates and/or angles of orientation). One example of this process is the use of the minutiae matcher. At step 220, the number of records provided for further analysis may again be reduced, but in this step the reductions may be based on orthogonal features such as minutiae constellation, ridge count, ridge connectivity, etc. One example of this process is the use of the expert matcher. At step 230, a threshold logic may be applied to reduce the candidate pool even further as a function of generally arbitrary user assigned criteria. Resulting records may be sent for manual examination to confirm or not the computer results.

Minutia on a search record is described as "mated" if there is corresponding minutiae on the file record, or if there is a corresponding minutiae that falls on or near the minutia on the file record. Other known print matching techniques may also be used in which the focus is on matching a file record individual minutiae, as well as features in the immediate vicinity of the file record individual minutiae, with corresponding search record individual minutiae, as well as features in the immediate vicinity of the individual print minutiae as known in the art.

Figure 3:
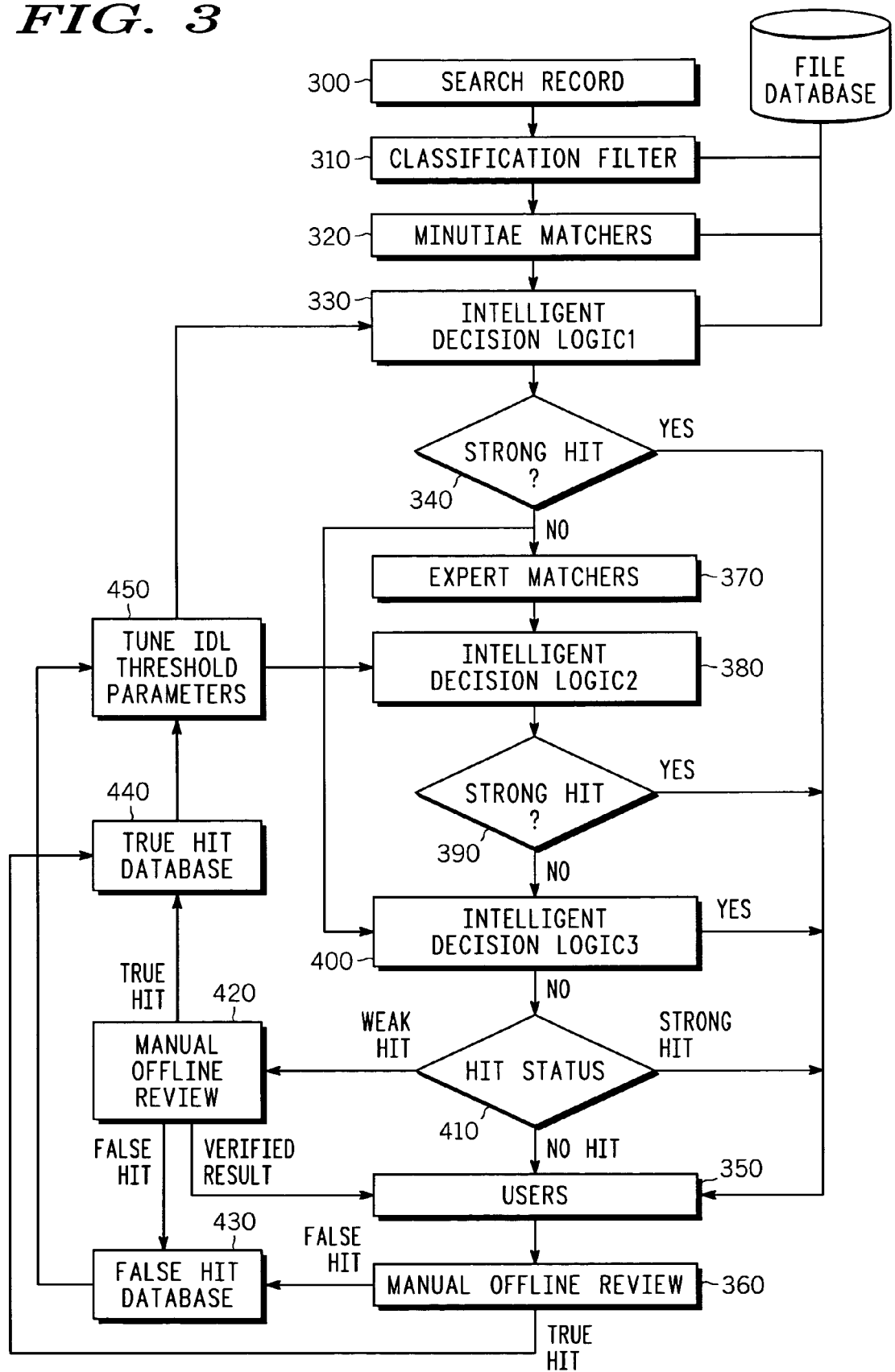
FIG. 3 is a flow diagram illustrating the improved matched fingerprint system in accordance with the present invention.

FIG. 3 illustrates an exemplary embodiment of the inventive system and method. As representatively shown, an exemplary down-selection process in accordance with the instant invention may begin with the provision of at least a plurality of records 300 to a classification filter as shown, for example, in step 310. At this step, the number of records may be at least partially reduced to comprise a subset of records provided for further processing in the minutiae matching step 320. Here, minutiae features may be employed to further reduce the number of records provided for subsequent enhanced matching.

Figure 4:
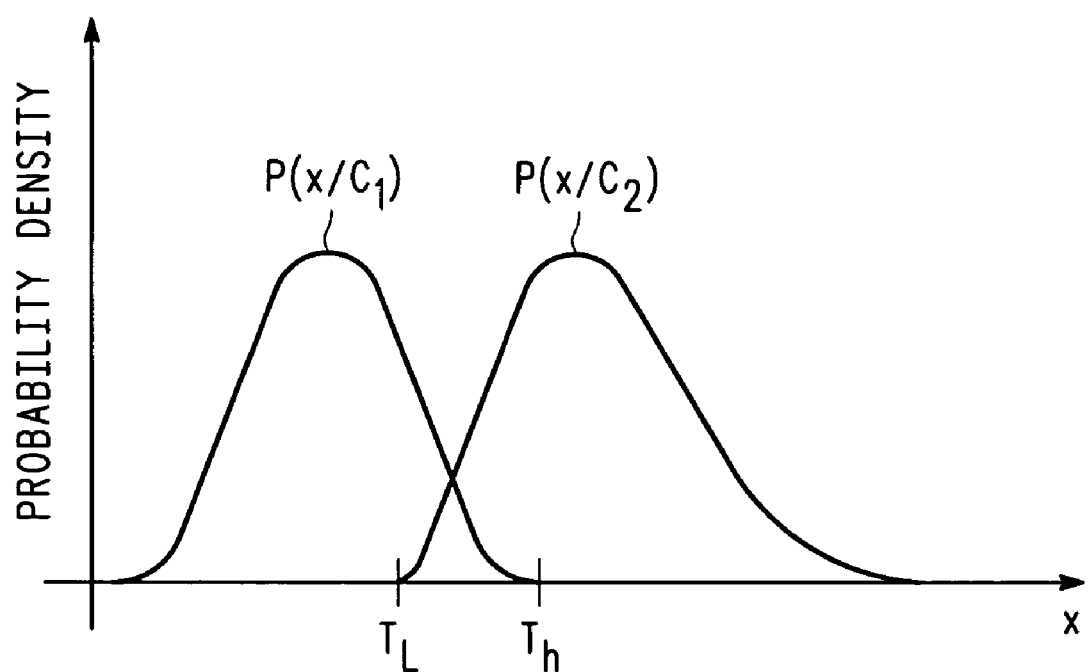
FIG. 4 is a graph illustrating the probability density of "strong" hits versus "weak" hits.

In a exemplary embodiment, an intelligent decision logic algorithm may be used to progressively provide data regarding matched scores of prints to determine whether the match of two sets of records, for example a ten print to ten print search, is mated or is a "HIT" or a "NO HIT" as representatively depicted in block 330. In addition to a record identification metric, the decision logic algorithm may be configured to provide inter alia an analysis of the accuracy of the match or "Hit" (i.e., the strength of the match). A strong match may be provided to users without fingerprint expert verification 350, while a weak match may be submitted to the expert matcher algorithm illustrated in block 370 for further processing. The strongly identified candidates "strong hits" are those with input features greater than their respective thresholds $T_h$. The weakly identified candidates "weak hits" are those with input features between threshold $T_L$ and $T_h$ respectively. As illustrated in FIG. 4.

An intelligent decision logic 2 algorithm (380) also may be configured to provide a record identification metric which may be processed to determine the accuracy (i.e., strength) of the resulting most probable matches returned from the expert matching system 370 as representatively shown in block 390. Depending on, for example, the strength of the results, the strong matched candidates may then be provided to users without fingerprint expert verification 350 or to intelligent decision logic 3 algorithm as illustrated, for example, in block 400. The results of the intelligent decision logic 3 may be determined as weak or strong matched candidates as illustrated in block 410 with strong matched candidates subsequently provided to users without fingerprint expert verification 350, while identified weak matched candidates are provided for fingerprint expert examination and the input features are saved for tuning logic elements 330 and 380 such that some weak matched candidates may be promoted to at least stronger hits upon iterative processing with the system in accordance with the exemplary embodiment as illustrated in FIG. 3.

False matched candidates determined by the fingerprint examiner in the manual search are sent to false hit database as illustrated in block 430. Matches determined to be true mates or hits by the manual examiner as illustrated 440 are included in a database. Intelligent decision logic parameters may be modified as illustrated in block 450 and false hits or matches computed by the intelligent decision logic 2 algorithm. It is understood that intelligent logic 2 and 3 algorithms may be run in any number of iterations until the examiner believes the most accurate results are obtained.

The following is a preferred, exemplary embodiment in accordance with a representative aspect of the instant invention, wherein the decision logic 1 and logic 2 may comprise the following features:

A match score for each finger of the candidate, this feature will be used in individual finger level identification;

A difference score (delta score) between two adjacent candidate scores for that finger and the difference score between the candidate fingerprint matched score and the mean of a set of non-matching candidate scores for that finger. This feature may also be also used in individual finger level identification;

An average match score of all fingers of the candidate, this feature will be used in record level identification;

A difference score (delta score) between two adjacent candidates averaged score and the difference score between the candidate and the mean of a set of non-matching candidate averaged scores. This feature will be also used in record level identification;

A finger number being searched and which fingers are used in this search; It is preferable to use data from fingers used to obtain the information during the decision making since different fingers exhibit different score characteristics. The number of fingers used for the search is also a preferred feature since the more the number of fingers matched for any given number of fingers indicates the strength the record level hit will be.;

An identification (ID) frequency, namely how many times the same ID appears in the top respondent lists of all the fingers (If the same ID appears many times, it may be probable that it corresponds to the most likely match); The feature is useful to identify weak matched candidates when none of the individual fingers score of the mated candidates appears on the top list of the searched finger, and the averaged score of the mated candidates also do not appear on the top list for that record.

The database size parameters derived from the design should take into consideration the size of the database since the features derived are directly related to the database.

The intelligent decision logic (IDL) algorithms utilize the foregoing features. First, IDL may determine the number of potential hits for each selected finger and then makes a record level decision based on individual finger hits status with record level features. The record level decision provides the number of identified match "hits" found for the search and the strength of each hit. Based on the strength of the hit, a more detailed match may be used to search these records again. If a strong hit is found, the search is complete. After the detail match, the results are re-evaluated by IDL again. In this way, the number of candidates for visual verification are reduced and it also improves the search response time. Since the decision is made in multi-level stages and more orthorgonal features are used, the identification accuracy is also improved.

The decision system may be configured to include three modules:

Minutiae matcher results evaluation Logic: logic1;
Secondary matcher results evaluation logic: logic2;
Hybrid weak hits evaluation logic module: logic3;

Based on the three representative logic modules, a progressive multi-level search scheme may be used. First the search may be carried out by using relatively fast minutiae matchers with the matched scores and the features mentioned in previous section provided, for example, to logic1 for analysis. If only strong hits result, then the identified candidates may be returned to the user without a fingerprint expert verification; if not, a slower, more detailed secondary match of the top N candidates may be performed. The matched scores may then be returned back to logic2 for analysis. If all hits are strong hits, then the identified strong hits candidates may be returned to the user without a fingerprint expert verification; if not, the logic-1 and logic2 results may be provided to logic3 for further analysis. In logic3, weak hits may be promoted or demoted according to a set of criteria. If strong hit candidates are found, the case may be returned to the user without fingerprint expert verification; if not and weak hit candidates are found, the weak hit candidates may be returned to a fingerprint examiner to review. If neither strong or weak hit candidates are found, a non-identification for the search in the database may be declared.

The exemplary method may be implemented in the C programming language and tested, for example, on several databases. The results show dramatic improvement over methods known in the art. For example, the exemplary method improves error rate by at least about 10% over the conventional fixed threshold method in cases in which four fingers are searched in tested databases.

The following is an exemplary embodiment of a progressive search scheme according to the invention. For a ten-print to ten-print search, n fingers may be used to search in a quantity (L) often-print cards database on a number (N) of minutiae matcher processors and a number (M) of expert matcher or secondary matcher processors. The progressive search and decision may include:

1. Loading ten-print search features into each minutiae matcher processor. The search features include but are not limited to minutiae, pattern, core, delta locations and other related features of prints known in the art;

2. Filtering a background database based on pattern features of the search print;

3. Partitioning the database in N number of minutiae match processors;

4. Matching search minutiae file against each background minutiae file in each processor for all the fingers to be searched;

5. Collecting all matched scores and their corresponding ID's and determining an average score for each ID;

6. Sorting the matched scores and their corresponding ID's according to a descending order for each searched finger;

7. Keeping the top P candidate scores and their ID's for each finger. Putting the sorted score into a match report n and the sorted average score into another match report n+1. P may be selected according to the mated ranking accuracy of minutiae matcher.

8. Sending the match reports and any other additional information to IDL logic1 for analysis. Additional information may include but not be limited to the number of fingers used, the finger index number, the size of the database searched in the process and the type of fingerprint (e.g., rolled, scanned, etc.).

9. Getting hit results from IDL logic1, if the hits are determined to be strong hits, the strong hit candidate ID's may be returned to the user without a fingerprint expert verification.

11. If the hits are determined not to be strong, loading the features of a search print to each expert matcher processor.

12. Distributing the P candidate file features into M number of EM processors.

13. Matching the search feature file against each background feature file in each EM processor for all the fingers to be searched.

14. Sorting each finger candidate EM score and finding average EM scores for each of the P candidates.

15. Putting the EM scores and candidate ID's into match reports as described in step 7. Sorting the average EM scores and putting them into the a match report also.

16. Sending the match reports and the other information to the IDL logic2;

17. Getting the results from IDL logic2; if the hits are strong and if so returning the strong hit candidate ID's to the user without a fingerprint expert verification.

18. Calling IDL Logic3 to promote or demote the weak hits from the logic2 and logic3.

19. Sending the weak hits to a fingerprint examiner for review and sending the strong hits to the user. A non-identification message may be sent to user.

Input features to IDL logic-1 include but are not limited to fingerprint type, number of fingers, finger index name, searched database size, minutiae matcher report for each finger, average scored match report.

The logic1 and logic2 consist of two sub-modules. The difference between logic1 and logic2 is the features came from two different types of matchers. The first module is to make strong hit and weak hit decision on individual finger level. The individual finger level identified hit candidate is evaluated according to three input features. The number of candidates for each finger evaluated is normally no more than N. The selection of N depends on the number of maximum duplicates in the database and the mated ranking accuracy of the matcher. The three input features are the match score; the delta score and the delta mean score. Assume the matched score for candidate I is s[I], the delta score for candidate I is defined as s[I]−s[I+1] and the delta mean score for the candidate is defined as s[I]−smean; where smean is defined as the average mean value from n's position of m number of non-matching scores. The selection of n should be greater than the maximum possible number of duplicates and m is should be select between 3 and half of the database size. The goal of this module is to find all the possible mated candidates and to separate the strongest mated candidate to weakly mated candidates. The second module is to make strong and weak candidate identification on record level. This module takes the individual finger "hit" information of all finger searched, record level feature information and database size to make card level decision. The output of the decision may comprise of three outcomes: strong hit, weak hit and no hit for the given candidate. The record level decision is based on the averaged scores, the number of finger used, the hit level status on each finger and id frequency above top N position for the searched database. For example, a four finger search in a two million database, if a candidate ID appears fifth position on one finger and tenth position on another finger even if none of its matched score and averaged score appear on the top position in their respective lists. The chance of the candidate for identification is very large since the probability of the scores of two fingers of two different persons matched well is very slim. The system could take this information and mark this instance as a weak identification. Any conventional optimization methods such as heuristic method, conjugated grading method or neural network can be used to design these modules. The logic3 is a decision sub-system to deal with all weakly identified candidates from the Enhanced matcher/Secondary matcher and Minutiae Matcher. The decision is based on the information received from logic1 and logic2. The system makes finial promotion or demotion on the weakly identified candidates. The designing of the logic3 can use heuristic rule based method or neural network approach to optimize the mated candidate and the non-mated candidates. The goal of this logic is to reduce number of candidate for fingerprint expert review.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language such as, for example, C, C++, Java, COBOL, assembler, PERL, extensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, mini-computer, mainframe, or the like running any operating system such as any version of Windows, Windows XP, Windows Whistler, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

The computing units may be connected with each other via a data communication network. The network may be a public network and assumed to be insecure and open to eavesdroppers. In one exemplary implementation, the network may be embodied as the internet. In this context, the computers may or may not be connected to the internet at all times. Specific information related to data traffic protocols, standards, and application software utilized in connection with the Internet may be obtained, for example, from DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference. A variety of conventional communications media and protocols may be used for data links, such as, for example, a connection to an Internet Service Provider (ISP) over the local loop as is typically used in connection with standard modem communication, cable modem, Dish networks, ISDN, Digital Subscriber Line (DSL), or various wireless communication methods. Polymorph code systems might also reside within a local area network (LAN) which interfaces to a network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "set of instructions", as used herein, is defined as a sequence of instructions designed for execution on a microprocessor or computer system. A program or set of instructions may include a subroutine, a function, a procedure, an object method, an object implementation, an executable application, an applet, a servlet, a source code, an object code, a shared library/dynamic load library and/or other sequence of instructions designed for execution of a computer system.

I claim:

1. A method comprising:
   receiving a search record and a plurality of file records from a database with each file record being identified by a different file record identification (ID), wherein the search and file records each comprise a plurality of prints corresponding to fingers on a hand, and each print is identified by a finger number that indicates a position of the corresponding finger on the hand;
   for each of at least some of the plurality prints in the search record, performing a search by comparing the print to the print in the file records having the same finger number and generating a corresponding sorted respondent list for the finger number comprising a portion of the plurality of file records, with each file record on the list being associated with a match score;
   determining a set of parameters comprising: the number of prints from the search record for which a search was performed and the corresponding finger numbers for those prints for which the search was performed, a size of the database, an average match score for each file record ID in the respondent lists, any file record IDs that appear on multiple respondent lists, any match scores on the respondent lists determined to be a non-matching score that is less than a match score threshold;
   determining a set of features based on the set of parameters;
   for the file records in the respondent lists, calculating at least one record identification metric based on the set of features and the set of parameters, wherein the record identification metric indicates whether there is a match between the search record and the corresponding file record.

2. The method of claim 1, wherein the at least one record identification metric further indicates strength of an identified match.

3. The method of claim 1, further comprising providing at least a portion of the file records in the respondent lists and the corresponding at least one record identification metric for enhanced matching algorithm processing.

4. The method of claim 1, wherein the method is applied in multiple matching stages to generate for at least some of the file records in the respondent lists a first record identification metric from a first matching stage and a second record identification metric from a second matching stage, which are used to calculate a third record identification metric, which indicates whether there is a match between the search record and the corresponding file record.

5. A method for comprising:
   for at least some of the file records in the respondent lists:
      generating at least a first and a second record identification metric according to the method of claim 1;
      calculating at least a third record identification metric;
      promoting at least one of the first or the second record identification metrics as a function of the at least third record identification metric.

6. A method comprising:
   for at least some of the file records in the respondent lists:
      generating at least a first and a second record identification metric according to the method of claim 1;
      calculating at least a third record identification metric;
      demoting at least one of the first or the second record identification metrics as a function of the at least third record identification metric.

7. The method of claim 1, wherein the at least one record identification metric is calculated based on at least one of an individual finger decision logic or a multiple finger decision logic.

8. The method of claim 7, wherein the individual finger decision logic uses first features included in the set of features, the first features comprising for each of at least a portion of the file records in the respondent lists:
   the match score for the file record;
   a score difference between the match score for the file record and the match score of an adjacent file record;
   a score difference between the match score for the file record and an average non-matching score calculated based on at least some of the non-matching scores.

9. The method of claim 8, wherein the multiple finger decision logic uses second features included in the set of features, the second features comprising for each of at least a portion of the file records in the respondent lists:
   the average match score for the file record;
   a score difference between the average match score for the file record and the average match score of an adjacent file record;
   a score difference between the average match score of the file record and an average non-matching score calculated based on at least some of the non-matching scores;
   a frequency of appearance if the file record appears on multiple respondent lists;
   results of the individual finger decision logic.

10. The method of claim 1, wherein the method is applied to generate for at least some of the file records in the respondent lists a first record identification metric using an individual finger decision logic and a second record identification metric using a multiple finger decision logic, which are used to calculate a third record identification metric that indicates whether there is a match between the search record and the corresponding file record.

11. The method of claim 10 further comprising,
for at least some of the file records in the respondent lists, calculating a match credibility metric as a function of at least one of: the number of prints from the search record for which a search was performed, the first record identification metric, or the second record identification metric.

12. The method of claim 10, further comprising providing a user with a set of file records from the respondent lists based on the calculated first, second and third record identification metrics.

13. A method comprising:
receiving a search record and a plurality of file records from a database with each file record being identified by a different file record identification (ID), wherein the search and file records each comprise a plurality of prints corresponding to fingers on a hand, and each print is identified by a finger number that indicates a position of the corresponding finger on the hand;
for each of at least some of the plurality prints in the search record, performing a search by comparing the print to the print in the file records having the same finger number and generating a corresponding sorted respondent list for the finger number comprising a portion of the plurality of file records, with each file record on the list being associated with a match score;
determining a set of parameters comprising: the number of prints from the search record for which a search was performed and the corresponding finger numbers for those prints for which the search was performed, a size of the database, an average match score for each file record ID in the respondent lists, any file record IDs that appear on multiple respondent lists, any match scores on the respondent lists determined to be a non-matching score that is less than a match score threshold;
determining a first and a second set of features based on the set of parameters;
for each of the file records in the respondent lists:
calculating a first record identification metric based on individual finger decision logic, which uses the set of parameters and the first set of features, wherein the first set of features comprises: the match score for the file record; a score difference between the match score for the file record and the match score of an adjacent file record; and a score difference between the match score for the file record and an average non-matching score calculated based on at least some of the non-matching scores;
calculating a second record identification metric based on multiple finger decision logic, which uses the set of parameters and the second set of features, wherein the second set of features comprises: the average match score for the file record; a score difference between the average match score for the file record and the average match score of an adjacent file record; a score difference between the average match score of the file record and an average non-matching score calculated based on at least some of the non-matching scores; a frequency of appearance if the file record appears on multiple respondent lists; results of the individual finger decision logic;
calculating at least a third record identification metric based on at least said first and second record identification metric;
at least one of promoting or demoting at least one of the first and the second record identification metrics as a function of the at least third record identification metric;
calculating a match credibility metric as a function of at least one of: the number of prints from the search record for which a search was performed, the first record identification metric, or the second record identification metric;
providing, for further enhanced matching algorithm processing, at least one of the first or the second record identification metric and the corresponding file record for at least a portion of the file records in the respondent lists;
providing a user with a set of file records based on at least one of the corresponding first record identification metric, second record identification metric or third record identification metric.

14. An automated digital processing system comprising:
means for receiving a search record and a plurality of file records from a database with each file record being identified by a different file record identification (ID), wherein the search and file records each comprise a plurality of prints corresponding to fingers on a hand, and each print is identified by a finger number that indicates a position of the corresponding finger on the hand;
for each of at least some of the plurality prints in the search record, means for performing a search by comparing the print to the print in the file records having the same finger number and generating a corresponding sorted respondent list for the finger number comprising a portion of the plurality of file records, with each file record on the list being associated with a match score;
means for determining a set of parameters comprising: the number of prints from the search record for which a search was performed and the corresponding finger numbers for those prints for which the search was performed, a size of the database, an average match score for each file record ID in the respondent lists, any file record IDs that appear on multiple respondent lists, any match scores on the respondent lists determined to be a non-matching score that is less than a match score threshold;
means for determining a first and a second set of features based on the set of parameters;
means for, for each of the file records in the respondent lists:
calculating a first record identification metric based on individual finger decision logic, which uses the set of parameters and the first set of features, wherein the first set of features comprises: the match score for the file record; a score difference between the match score for the file record and the match score of an adjacent file record; and a score difference between the match score for the file record and an average non-matching score calculated based on at least some of the non-matching scores;
calculating a second record identification metric based on multiple finger decision logic, which uses the set of parameters and the second set of features, wherein the second set of features comprises: the average match score for the file record; a score difference between the average match score for the file record and the average match score of an adjacent file record; a score difference between the average match score of the file record and an average non-matching score calculated based on at least some of the non-matching scores; a frequency of appearance if the file record appears on multiple respondent lists; results of the individual finger decision logic;

means for calculating at least a third record identification metric based on at least said first and second record identification metric;

means for at least one of promoting or demoting at least one of the first and the second record identification metrics as a function of the at least third record identification metric;

means for calculating a match credibility metric as a function of at least one of: the number of prints from the search record for which a search was performed, the first record identification metric, or the second record identification metric;

means for providing, for further enhanced matching algorithm processing, at least one of the first or the second record identification metric and the corresponding file record for at least a portion of the file records in the respondent lists;

means for providing a user with a set of file records based on at least one of the corresponding first record identification metric, second record identification metric or third record identification metric.

* * * * *

UNITED STATES PATENT AND TRADEMARK OFFICE
CERTIFICATE OF CORRECTION

PATENT NO. : 7,313,256 B2 Page 1 of 1
APPLICATION NO. : 10/674665
DATED : December 25, 2007
INVENTOR(S) : Peter Lo It is certified that error appears in the above-identified patent and that said Letters Patent is hereby corrected as shown below:

Claim 5, line 22, please delete "for".

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,313,256 B2 Page 1 of 1
APPLICATION NO. : 10/674665
DATED : December 25, 2007
INVENTOR(S) : Peter Lo It is certified that error appears in the above-identified patent and that said Letters Patent is hereby corrected as shown below:

Column 12, Claim 5, line 22, please delete "for".

This certificate supersedes the Certificate of Correction issued December 16, 2008.

Signed and Sealed this

Sixth Day of January, 2009

JON W. DUDAS
*Director of the United States Patent and Trademark Office*